United States Patent
Li et al.

(10) Patent No.: US 8,923,417 B1
(45) Date of Patent: Dec. 30, 2014

(54) METHODS AND APPARATUS FOR TRANSCEIVER POWER NOISE REDUCTION

(75) Inventors: Zhe Li, San Jose, CA (US); Hong Shi, Fremont, CA (US)

(73) Assignee: Altera Corporation, San Jose, CA (US)

( * ) Notice: Subject to any disclaimer, the term of this patent is extended or adjusted under 35 U.S.C. 154(b) by 372 days.

(21) Appl. No.: 13/349,418

(22) Filed: Jan. 12, 2012

(51) Int. Cl.
*H04B 3/00* (2006.01)
*H04L 25/00* (2006.01)

(52) U.S. Cl.
USPC ........... 375/257; 375/279; 375/134; 714/739; 370/515

(58) Field of Classification Search
CPC ..... H04L 25/03866; G06F 7/584; H03K 3/84
USPC .................... 375/279, 134; 714/739; 370/515
See application file for complete search history.

(56) References Cited

U.S. PATENT DOCUMENTS

| | | | |
|---|---|---|---|
| 4,344,066 A | 8/1982 | Beggs | |
| 4,357,598 A | 11/1982 | Melvin, Jr. | |
| 4,912,553 A | 3/1990 | Pal et al. | |
| 5,073,909 A * | 12/1991 | Kotzin et al. | 377/72 |
| 5,357,363 A | 10/1994 | Li et al. | |
| 5,546,467 A | 8/1996 | Denenberg | |
| 5,903,594 A | 5/1999 | Saulnier et al. | |
| 6,335,494 B1 | 1/2002 | Gregor et al. | |
| 6,885,209 B2 * | 4/2005 | Mak et al. | 324/750.3 |
| 7,180,972 B1 * | 2/2007 | Venkata et al. | 375/371 |
| 7,698,088 B2 * | 4/2010 | Sul et al. | 702/122 |
| 7,817,439 B2 | 10/2010 | Hosomi | |
| 7,839,654 B2 | 11/2010 | Choi | |
| 7,886,259 B2 | 2/2011 | Vazquez et al. | |
| 7,945,884 B1 * | 5/2011 | Goergen et al. | 716/126 |
| 2003/0081775 A1 * | 5/2003 | Campagna et al. | 380/46 |
| 2005/0278160 A1 * | 12/2005 | Donnelly et al. | 703/19 |
| 2006/0281425 A1 * | 12/2006 | Jungerman | 455/183.2 |
| 2007/0101241 A1 * | 5/2007 | Hoyer | 714/776 |
| 2007/0204204 A1 * | 8/2007 | Sul et al. | 714/776 |
| 2007/0280478 A1 * | 12/2007 | Verdun | 380/255 |
| 2008/0130891 A1 * | 6/2008 | Sun et al. | 380/268 |
| 2008/0260049 A1 * | 10/2008 | Wood | 375/257 |
| 2009/0086972 A1 * | 4/2009 | Mozak | 380/268 |
| 2009/0201973 A1 * | 8/2009 | Cranford et al. | 375/130 |
| 2011/0106997 A1 * | 5/2011 | Romero et al. | 710/300 |

\* cited by examiner

*Primary Examiner* — Shuwang Liu
*Assistant Examiner* — Sung Ahn
(74) *Attorney, Agent, or Firm* — Okamoto & Benedicto LLP (57) ABSTRACT

Embodiments disclosed herein relate to apparatus and methods of transceiver power noise reduction. One embodiment relates to a method of serial data communication. At a transmitter, data may be encoded by a communication protocol encoder, and the protocol-encoded data may be serialized. The serialized data may be encoded for power-delivery-network noise reduction (PNR) so as to generate PNR-encoded serial data, and the PNR-encoded serial data may be driven onto a communication channel. Other embodiments, aspects, and features are also disclosed.

20 Claims, 12 Drawing Sheets

FIG. 7 (May use for 402 and 502)

METHODS AND APPARATUS FOR TRANSCEIVER POWER NOISE REDUCTION

BACKGROUND

1. Technical Field

The present invention relates generally to communication links including, but not limited to, serial interfaces for integrated circuits.

2. Description of the Background Art

High-speed communication links using serial interface protocols are used to communicate data between devices in a system. Examples of industry-standard protocols for high-speed input/output (HSIO) links include those related to PCI Express (Peripheral Component Interconnect Express), XAUI (X Attachment Unit Interface), sRIO (serial Rapid IO), and many others.

Power delivery network (PDN) noise couples through power rails to transceiver channels and degrades channel performance due to increased jitter and reduced eye openings. PDN noise often surges when signals through transceiver circuit blocks excite PDN resonances. In addition, the sharing of the power delivery network among multiple transceiver blocks causes undesired channel-to-channel power noise coupling. As the serial links approach speeds of 20 gigabits per second (Gbps) and above, PDN noise often has a substantial impact on transceiver channel performance.

A conventional approach to reducing PDN noise focuses on physical design implementations. For example, PDN impedances may be controlled by adding an on-die and/or an on-package decoupling capacitance, or by reducing package inductance by increasing package layer counts.

SUMMARY

One embodiment relates to a method of serial data communication. At a transmitter, data may be encoded by a communication protocol encoder, and the protocol-encoded data may be serialized. The serialized data may be encoded for power-delivery-network noise reduction (PNR) so as to generate PNR-encoded serial data, and the PNR-encoded serial data may be driven onto a communication channel.

Another embodiment relates to an apparatus for serial data communication. A communication protocol encoder may be configured to encode data to generate protocol-encoded data, and a serializer may be configured to serialize the protocol-encoded data to generate serialized data. A PNR encoder may be configured to encode the serialized data to generate PNR-encoded serial data, and a driver circuit may be configured to drive the PNR-encoded serial data onto a communication channel.

Another embodiment relates to a system for serial data communication. The transmitter includes a PNR encoder configured to encode serialized data to generate PNR-encoded serial data, and a driver circuit configured to drive the PNR-encoded serial data onto a communication channel. The receiver includes a buffer configured to receive the PNR-encoded serial data from the communication channel, and a PNR decoder configured to decode the PNR-encoded serial data to re-generate the serialized data.

Another embodiment relates to a method of receiving the PNR-encoded serial data. At a receiver, the PNR-encoded serial data may be received from the communication channel, and the PNR-encoded serial data may be decoded to re-generate the serialized data. The serialized data may then be deserialized to re-generate the protocol-encoded data in parallel form, and the protocol-enabled data may be decoded to re-generate the data.

Another embodiment relates to an apparatus for receiving the PNR-encoded serial data. A buffer may be configured to receive the PNR-encoded serial data from the communication channel, and a PNR decoder may be configured to decode the PNR-encoded serial data to re-generate the serialized data. A deserializer may be configured to deserialize the serialized data to re-generate the protocol-encoded data, and a communication protocol decoder may be configured to decode the protocol-enabled data to re-generate the data.

DETAILED DESCRIPTION

The present disclosure provides methods and apparatus which advantageously address problems due to the impact of PDN noise on transceiver channel performance. The present disclosure provides a PDN-noise-reduction (also referred to as power-noise-reducing or PNR) encoder at a transmitter and a corresponding PNR decoder at a receiver. The PNR encoding and decoding are separate and distinct from the encoding and decoding required by a communication protocol for a serial link. The PNR encoding and decoding may be advantageously utilized to reduce undesired surges of noise due to PDN resonances.

Figure 1:
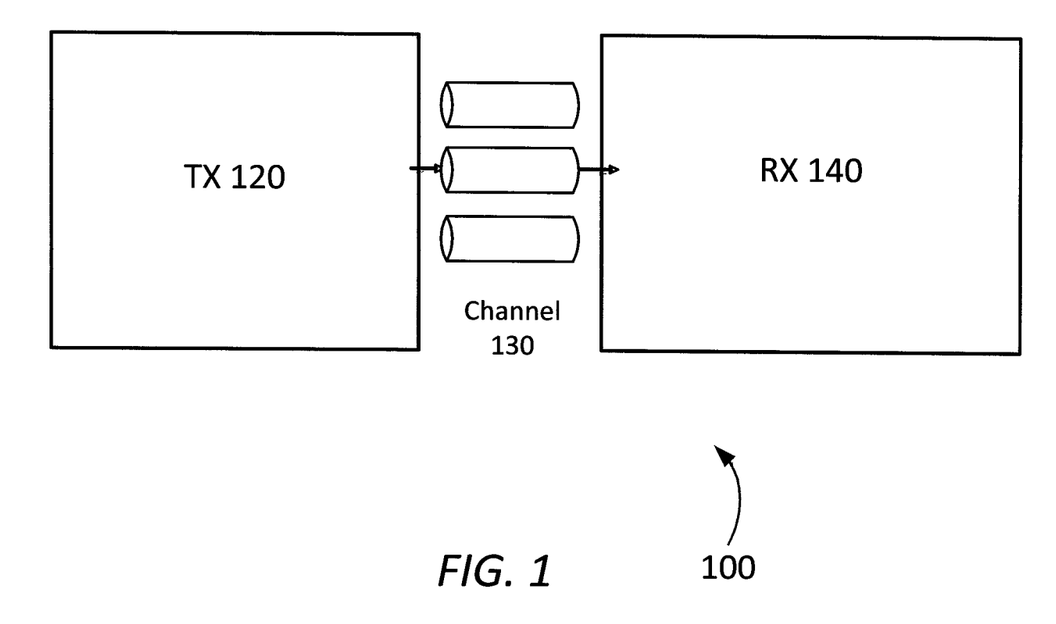
FIG. 1 is a high-level diagram of an exemplary communication link in accordance with an embodiment of the invention.

FIG. 1 is a high-level diagram of an exemplary communication link in accordance with an embodiment of the invention. As shown in FIG. 1, a communication link is generally composed of a transmitter (TX) circuit 120, a receiver (RX) circuit 140, and a communication channel (CH) 130 that is located in between the transmitter and the receiver. The channel 130 may be arranged to communicate a serial data signal from the transmitter 120 to the receiver 140. The channel 130 may use multiple lanes to communicate the serial data signal.

Figure 2:
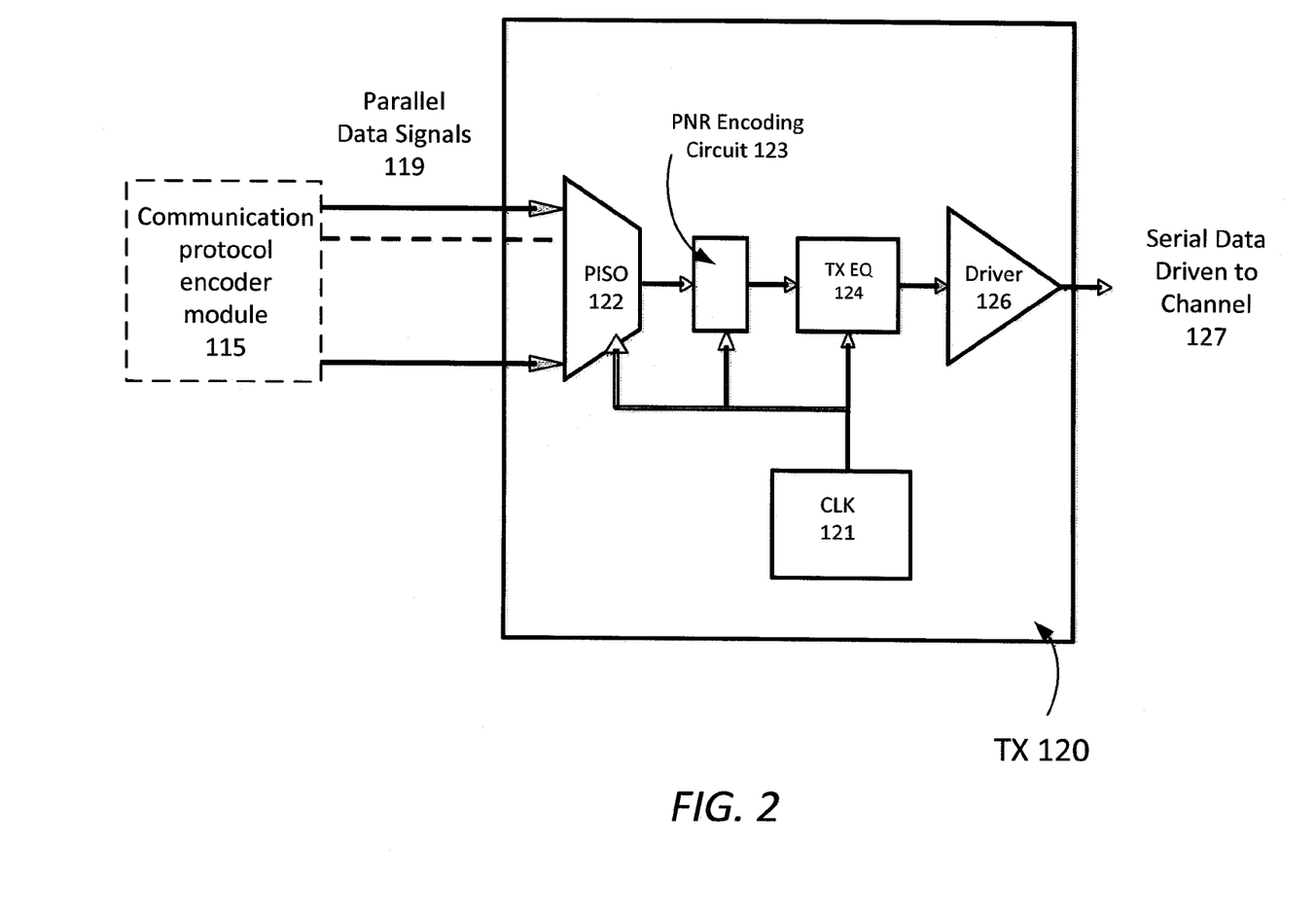
FIG. 2 depicts an exemplary transmitter circuit arranged with a PDN noise reducing capability in accordance with an embodiment of the invention.

FIG. 2 depicts an exemplary transmitter (TX) circuit 120 arranged with a PDN noise reducing capability in accordance with an embodiment of the invention. The TX circuit 120 may include a parallel-in-serial-out (PISO or serializer) circuit 122. The PISO circuit 122 is arranged to receive parallel data signals 119 and convert them to a serial data signal. For example, the TX circuit 120 may be part of an integrated circuit, and the parallel data signals 119 may be provided by a communication protocol encoder module 115 in the integrated circuit. The communication protocol encoder module 115 may be configured to encode the data in accordance with a specification for a communication protocol for a high-speed serial interface. The encoding may include, for example, 8b/10b or 64b/66b encoding, depending on the protocol being used.

In accordance with an embodiment of the invention, the serial data signal output from the PISO 122 may be encoded by a PNR-encoding circuit 123. An exemplary PNR-encoding circuit 123 is described further below in relation to FIG. 4. The PNR-encoding circuit 123 may be advantageously configured to encode the serial data signal so as to reduce undesired surges of noise due to PDN resonances.

The serial data signal output by the PNR-encoding circuit 123 may be adjusted by a transmitter equalizer (TX EQ) circuit 124. The TX EQ circuit 124 may be configured to perform one or more equalizations to compensate for high-frequency signal loss in the channel. Clock generator (CLK) circuit 121 may utilize a phase locked loop circuit to provide a clock signal to the PISO 122, PNR encoding 123, and TX EQ 124 circuits. The output from the TX EQ 124 circuit may be provided to a driver circuit 126. The driver circuit 126 may be configured to drive the serial data signal 127 to the channel 130.

Figure 3:
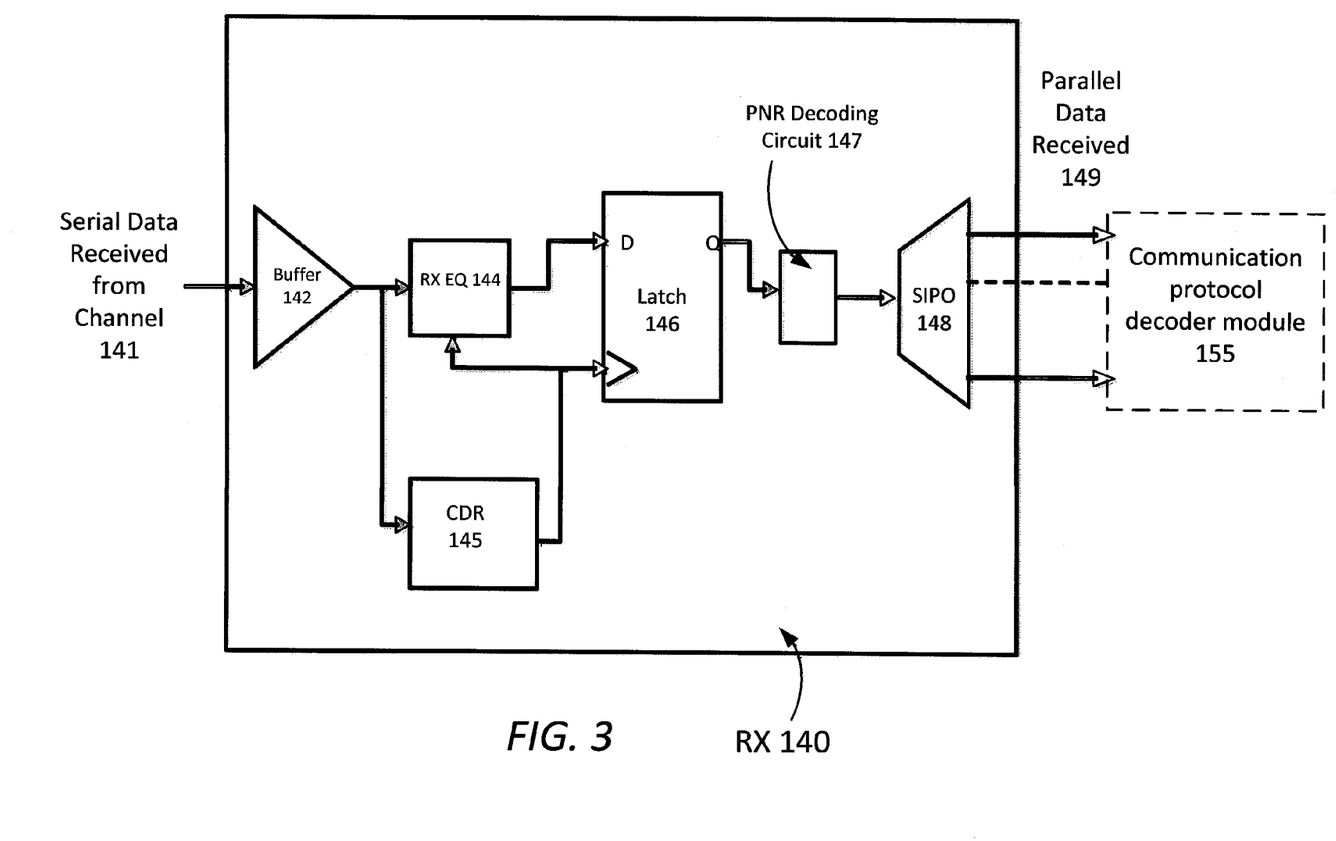
FIG. 3 depicts an exemplary receiver circuit arranged with a PDN noise reducing capability in accordance with an embodiment of the invention.

FIG. 3 depicts an exemplary receiver (RX) circuit 140 arranged with a PDN noise reducing capability in accordance with an embodiment of the invention. The RX circuit 140 may be configured to receive the transmitted serial data signal 141 from the multiple-lane channel into buffer circuitry 142.

The buffer circuitry 142 may output the received serial data signal to a receiver equalization (RX EQ) circuit 144 and also to a clock data recover (CDR) circuit 145. The CDR circuit 145 may use a PLL to recover the clock signal from the serial data signal. The recovered clock signal may be provided to the RX EQ circuit 144 and to a latch circuit 146. The RX EQ circuit 144 may be configured to perform one or more equalizations to compensate for high-frequency signal loss in the channel. More generally, the communication link may perform equalization using either a TX EQ circuit, or a RX EQ circuit, or both TX and RX EQ circuits.

The latch circuit 146 may be configured to receive the serial data signal from the RX EQ circuit 144 and to receive the recovered clock signal from the CDR circuit 145. The latch circuit 146 outputs a regenerated serial data signal.

In accordance with an embodiment of the invention, the serial data signal output from the latch circuit 146 may be decoded by a PNR-decoding circuit 147. An exemplary PNR-decoding circuit 147 is described further below in relation to FIG. 5. The PNR-decoding circuit 147 may be advantageously configured to decode the serial data signal which was previously encoded by a corresponding PNR-encoding circuit 123 at the transmitter 120.

The SIPO (deserializer) circuit 148 is configured to receive the PNR-decoded serial data signal from the PNR-decoding circuit 147 and convert it to parallel data signals. The parallel data signals 149 may be provided to other circuitry of the receiving device. For example, the receiving device may be an integrated circuit, and the parallel data signals 149 may be provided to a communication protocol decoder module 155 in the integrated circuit. The communication protocol decoder module 155 may be configured to decode the data in accordance with a specification for a communication protocol for a high-speed serial interface. The decoding may include, for example, 10b/8b or 66b/64b decoding, depending on the protocol being used.

Figure 4:
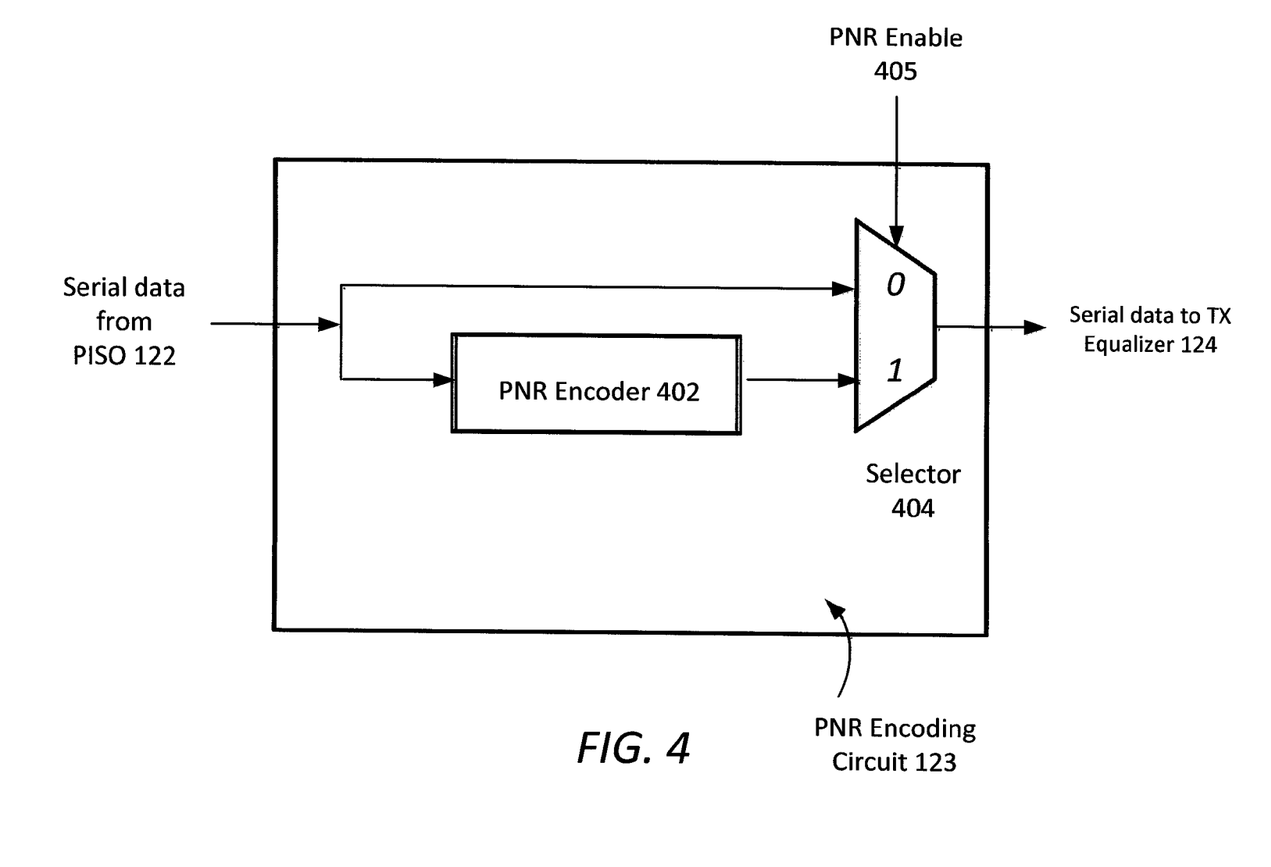
FIG. 4 is a schematic diagram of an exemplary encoding circuit for PDN noise reduction in accordance with an embodiment of the invention.

FIG. 4 is a schematic diagram of an exemplary PNR-encoding circuit 123 in accordance with an embodiment of the invention. As shown, the PNR-encoding circuit 123 may include two data paths. A first data path encodes the data signal for PDN noise reduction using the PNR encoder 402. Exemplary PNR encoders are described further below in relation to FIGS. 6 and 7. A second data path bypasses the PNR encoder 402. The data path that is utilized may be selected by the selector 404 under control of a PNR enable signal 405.

Figure 5:
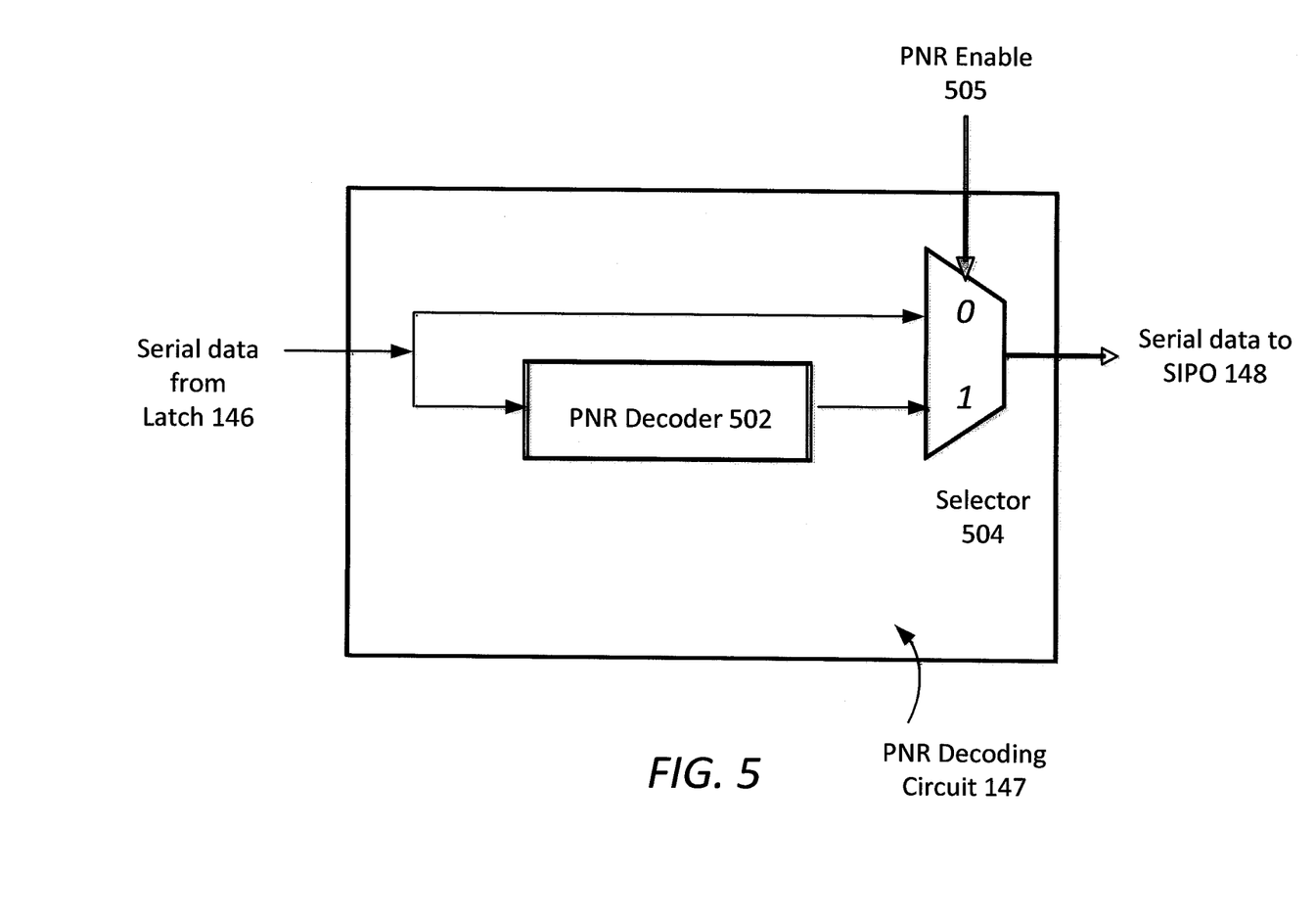
FIG. 5 is a schematic diagram of an exemplary decoding circuit for PDN noise reduction in accordance with an embodiment of the invention.

FIG. 5 is a schematic diagram of an exemplary PNR-decoding circuit 147 in accordance with an embodiment of the invention. As shown, the PNR-decoding circuit 147 may include two data paths. A first data path decodes the data signal for PDN noise reduction using the PNR decoder 502. Exemplary PNR decoders are described further below in relation to FIGS. 6 and 7. A second data path bypasses the PNR decoder 502. The data path that is utilized may be selected by the selector 504 under control of a PNR enable signal 505.

If PNR is enabled at the transmitter 120 at one end of the channel 130, then PNR should also be enabled at the receiver 140 at the other end of the channel 130. If PNR is not enabled at the transmitter 120 at one end of the channel 130, then PNR should also not be enabled at the receiver 140 at the other end of the channel 130.

Figure 6:
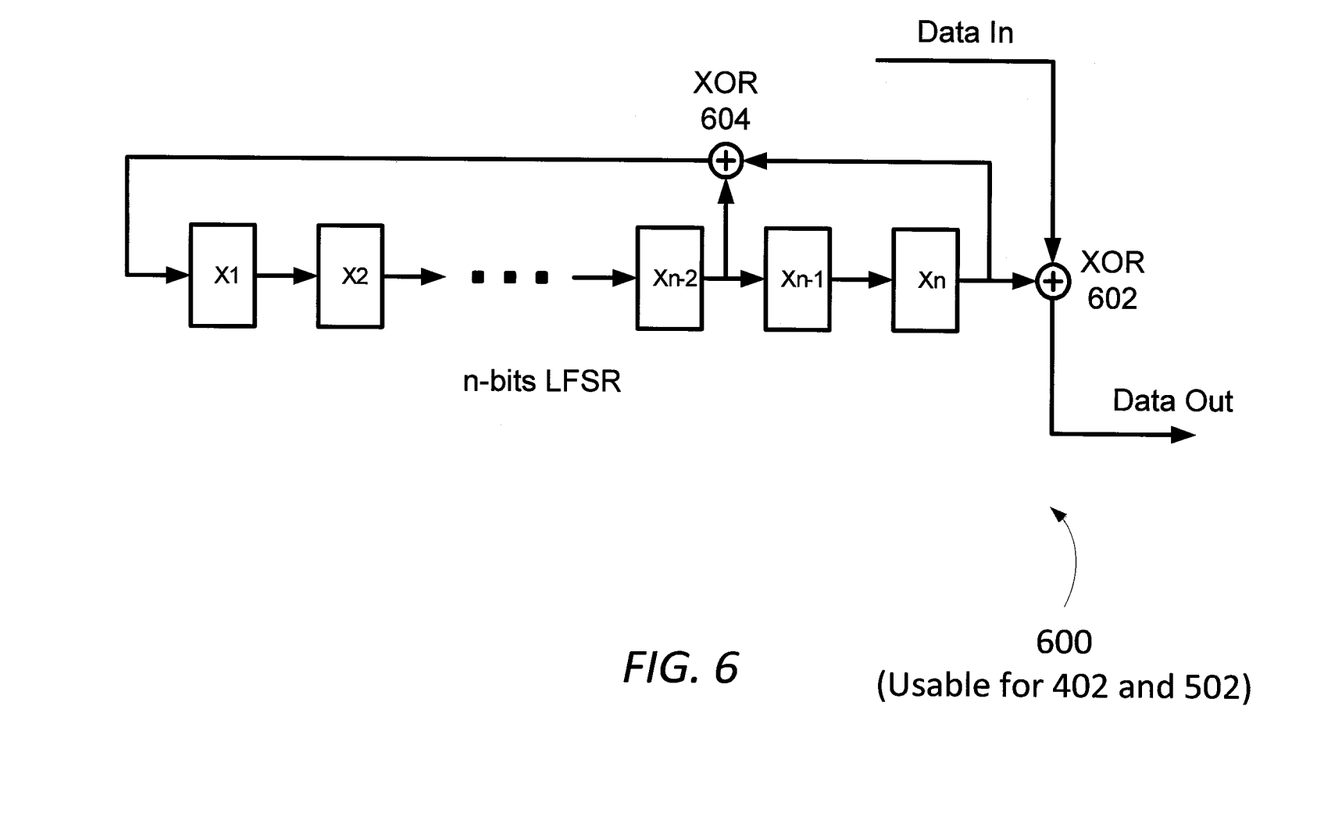
FIG. 6 depicts an exemplary circuit that is useable as an encoder and decoder pair for PDN noise reduction in accordance with an embodiment of the invention.

FIG. 6 depicts an exemplary circuit 600 that is useable as an encoder and decoder pair PDN noise reduction in accordance with an embodiment of the invention. As shown, the circuit 600 may include an n-bit linear feedback shift register (LFSR) which has a cascade of n flip-flop circuits (X1, X2, . . . , Xn−2, Xn−1, and Xn). The n flip flop circuits may be provided with initial seed values.

In the exemplary embodiment depicted, a first exclusive-OR (XOR) gate 602 may have two inputs and an output. The two inputs of the first XOR gate 602 are the Data In signal and the output of the last flip flop circuit Xn of the cascade. The output of the first XOR gate 602 is the Data Out signal.

As further depicted, at least one configurable XOR gate 604 is also included. The two inputs of the configurable XOR gate 604 may be, for example, the outputs of a last flip flop circuit (Xn) and an interior flip flop circuit (Xn−2, in the example illustrated) in the cascade, and the output of the configurable XOR gate 604 may be the input to a first flip flop (X1) circuit in the cascade. The interior flip flop circuit may be selected from flip flops in an interior of the cascade depending on resonance characteristics of the PDN noise being suppressed.

When the circuit 600 is used as a PNR encoder 402, then the Data In signal may be the serial data signal from the PISO 122, and the Data Out signal may be the serial data signal output to the selector 404. When the circuit 600 is used as a PNR decoder 502, then the Data In signal may be the serial data signal from the latch 146, and the Data Out signal may be the serial data signal output to the selector 504. The configurable XOR gate 604 should be the same for a PNR encoder 402 and decoder 502 pair. In addition, the seed value for the flip flop cascade should also be the same for a PNR encoder 402 and decoder 502 pair.

Figure 7:
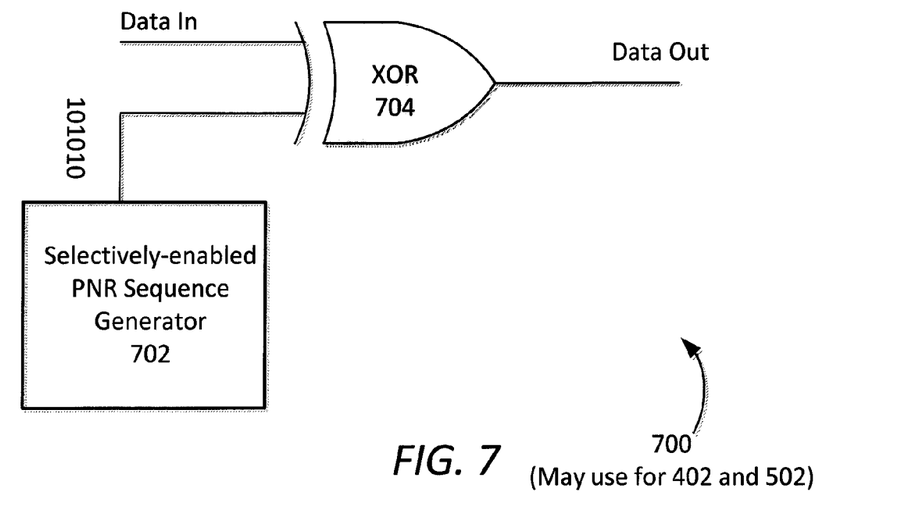
FIG. 7 depicts an alternate exemplary circuit that is useable as an encoder and decoder pair for PDN noise reduction in accordance with an embodiment of the invention.

FIG. 7 depicts an alternate exemplary circuit 700 that is useable as an encoder and decoder pair for PDN noise reduction in accordance with an embodiment of the invention. As shown, the circuit 700 may include a selectively-enabled PNR sequence generator 702 and an XOR gate 704. While the circuit 700 shown in FIG. 7 uses an XOR gate 704, an alternate embodiment may use an exclusive-NOR (XNOR) gate.

The PNR sequence generator 702 may be selectively-enabled to encode portions of the data sequence while other portions of the data sequence remain unencoded. In one embodiment, the PNR sequence generator 702 may be enabled periodically to reduce PDN noise at a resonant frequency.

When the circuit 700 is used as a PNR encoder 402, then the Data In signal may be the serial data signal from the PISO 122, and the Data Out signal may be the serial data signal output to the selector 404. When the circuit 700 is used as a PNR decoder 502, then the Data In signal may be the serial data signal from the latch 146, and the Data Out signal may be the serial data signal output to the selector 504.

The PNR sequence generator 702 may be configured in a same manner for a PNR encoder 402 and decoder 502 pair. In particular, the selective-enablement of the PNR sequence generator 702 may be coordinated between the encoder 402 and decoder 502 such that only the encoded portions of the data sequence are decoded. In one implementation, the PNR sequence generated may be the same between the encoder 402 and the decoder 502. In one exemplary implementation, when enabled, the PNR sequence generator 702 (at both the encoder 402 and decoder 502) may generate a sequence of alternating bits, such as the bit sequence 101010, for instance.

Figure 8:
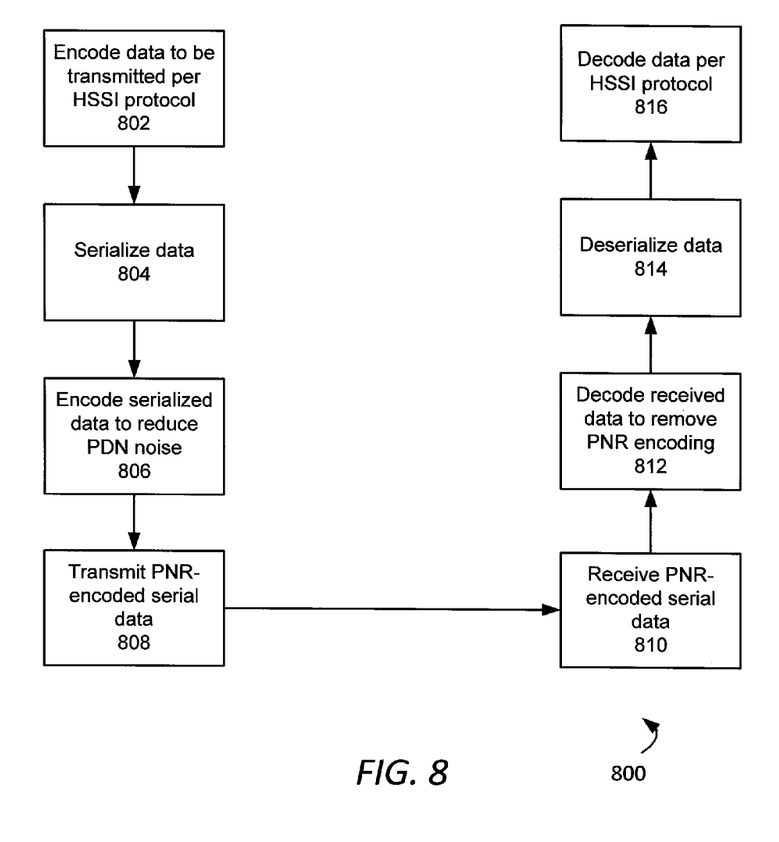
FIG. 8 is a flow chart showing an exemplary method of transceiver PDN noise reduction in accordance with an embodiment of the invention.

FIG. 8 is a flow chart showing an exemplary method 800 of transceiver PDN noise reduction in accordance with an embodiment of the invention. Blocks 802 through 808 are steps that may be performed at a transmitter on one side of a communication link, while blocks 810 through 816 are steps that may be performed at a receiver on the other side of the communication link.

Per block 802, parallel data may be encoded per a HSSI protocol (for example, by communication protocol encoder module 115 coupled to a transmitter circuit 120) to generate protocol-encoded data. Per block 804, the protocol-encoded data may be serialized (for example, by PISO 122). Per block 806, the serialized data may be further encoded to reduce PDN noise (for example, by PNR-encoding circuit 122). Per block 808, the PNR-encoded serial data may be transmitted over the communication channel (for example, by the driver 126).

Per block 810, the PNR-encoded serial data may be received (for example, by buffer 142 of a receiver circuit 140). Per block 812, the serial data may be decoded to remove the PNR encoding (for example, by PNR-decoding circuit 147). Per block 814, the data may be deserialized (for example, by SIPO 148) to re-generate the protocol-encoded data in parallel form. Finally, per block 816, the protocol-encoded data may be decoded per the HSSI protocol (for example, by communication protocol decoder module 155) to re-generate the original parallel data.

Figure 9:
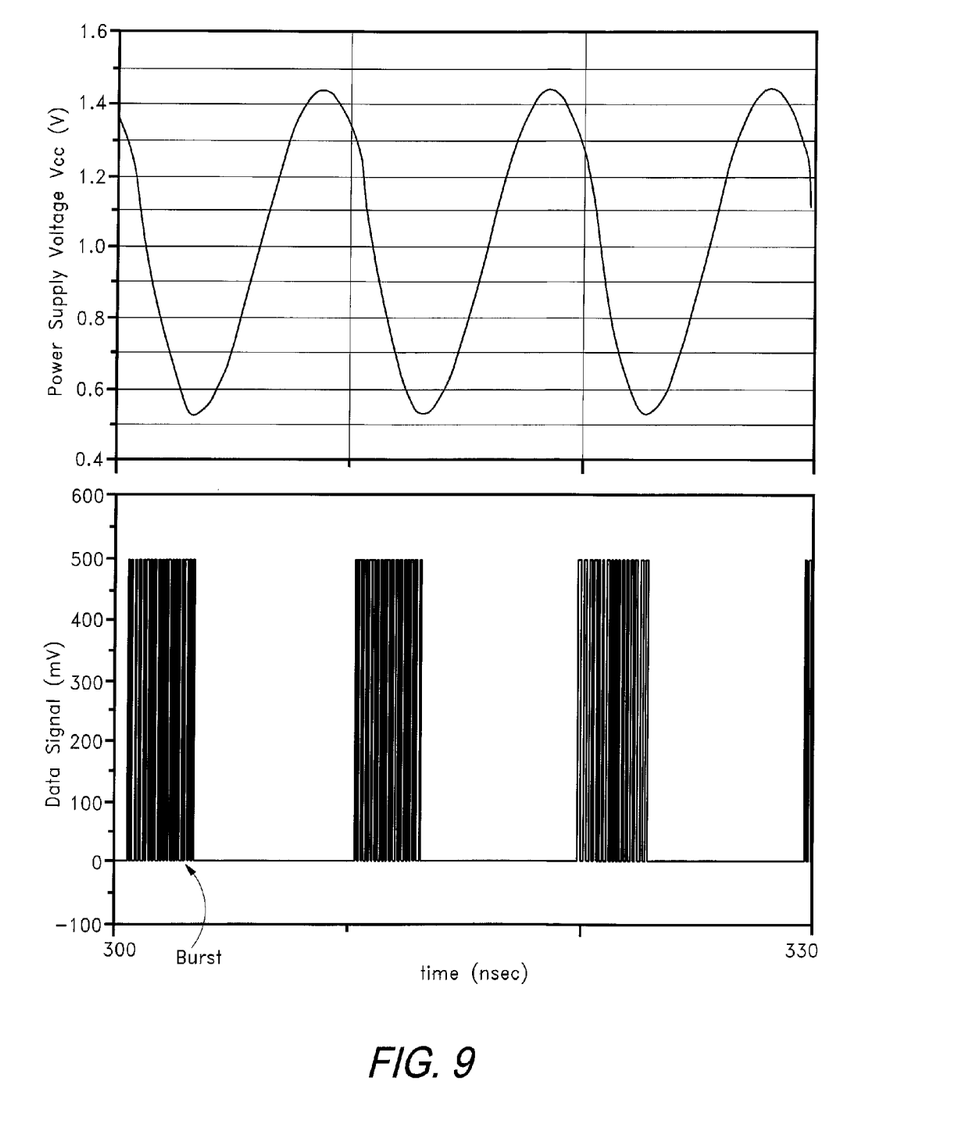
FIG. 9 depicts a periodic burst data signal and a corresponding power supply voltage.
Figure 10:
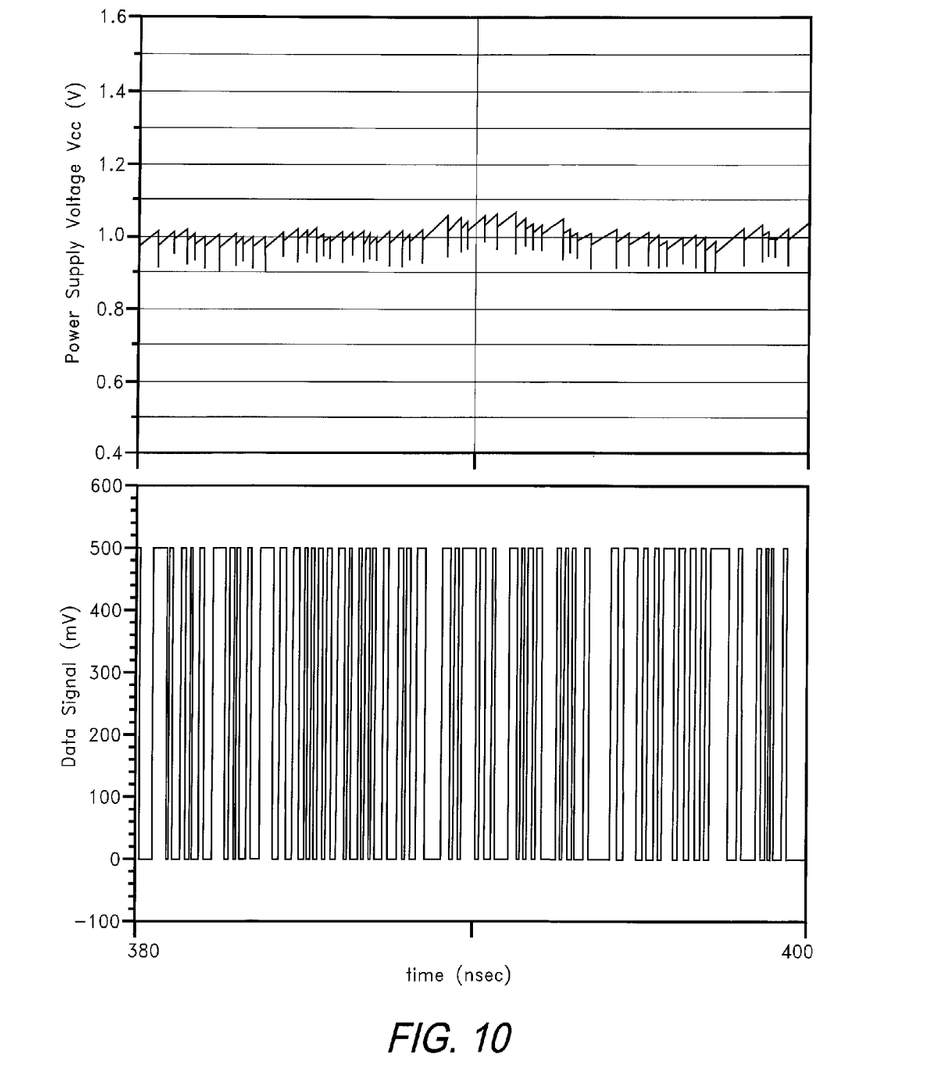
FIG. 10 depicts a pseudo-random data signal and a corresponding power supply voltage.

One reason behind the effectiveness of the PNR encoding is now discussed in relation to FIGS. 9 and 10. FIG. 9 depicts a periodic burst data signal in the lower graph and a corresponding power supply voltage in the upper graph. As seen, the power supply voltage in FIG. 9 has substantial noise with a peak-to-peak variance of almost one volt. Such substantial noise (substantial variance) in the power supply voltage may be due to the periodic burst signal exciting a PDN resonance frequency.

In contrast, FIG. 10 depicts a pseudo-random data signal in the lower graph and a corresponding power supply voltage in the upper graph. In this example, the data signal is a pseudo-random binary sequence, in particular, PRBS-15. As seen, the power supply voltage in FIG. 10 has lower noise with a peak-to-peak variance of about 0.1 volt. Hence, the power supply voltage in FIG. 10 has an order of magnitude less variance compared to the power supply voltage in FIG. 9.

In accordance with an embodiment of the invention, the PNR encoding may be advantageously configured such that the data signal reduces the excitation of PDN resonance frequencies. As such, the resonant variations in power supply voltage, such as depicted in FIG. 9, may be advantageously reduced, so as to achieve lower variance in the power supply voltage, such as illustrated in FIG. 10.

Figure 11:
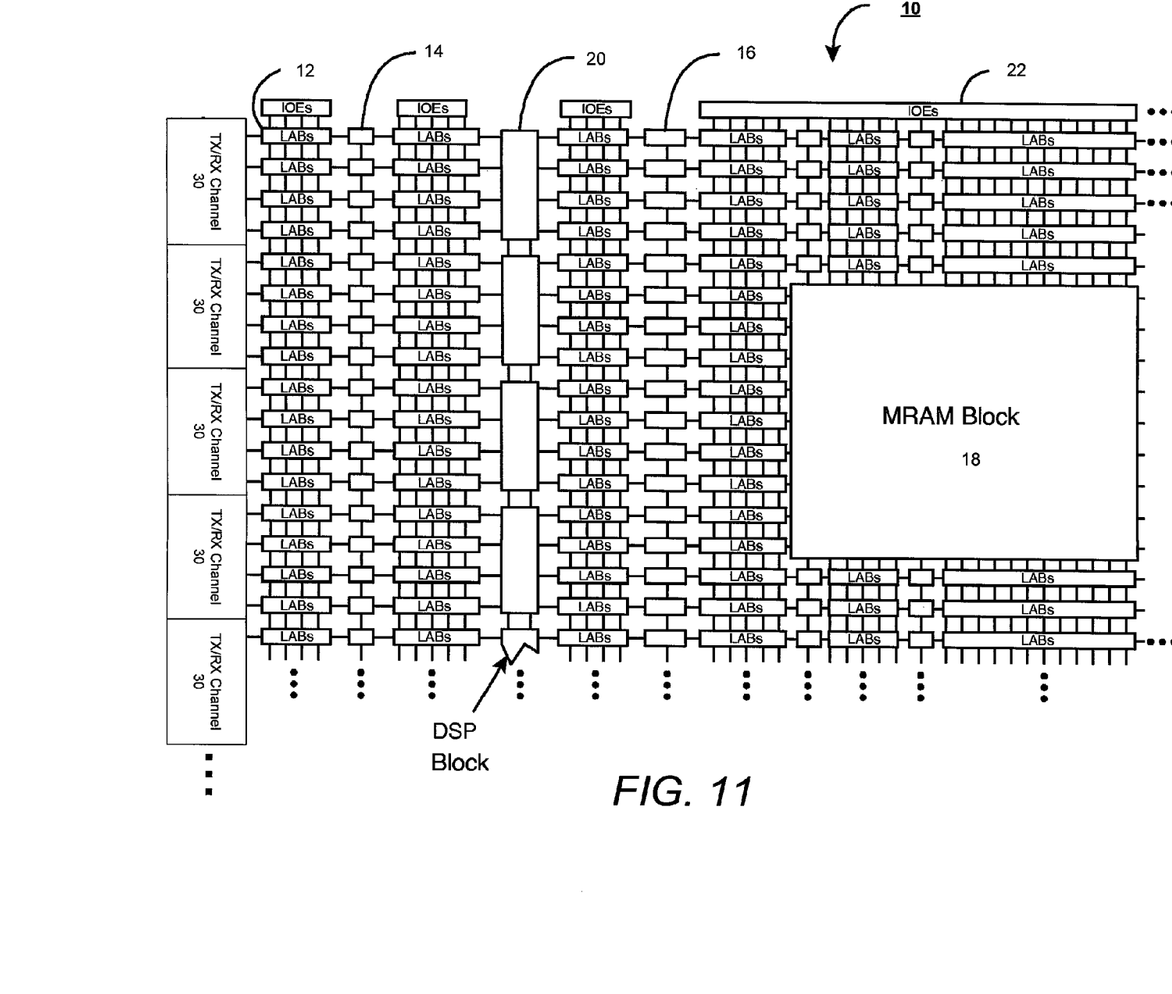
FIG. 11 is a simplified partial block diagram of an exemplary field programmable gate array (FPGA) that may be configured to implement an embodiment of the present invention.

FIG. 11 is a simplified partial block diagram of an exemplary field programmable gate array (FPGA) 10 that may be configured to implement an embodiment of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs). A LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10. A transceiver (TX/RX) channel array may be arranged as shown, for example, with each TX/RX channel circuit 30 being coupled to several LABs. A TX/RX channel circuit 30 may include, among other circuitry, transmitter and receiver circuitry configured to reduce power delivery network (PDN) noise as described herein.

It is to be understood that FPGA 10 is described herein for illustrative purposes only and that the present invention can be implemented in many different types of PLDs, FPGAs, and ASICs.

Figure 12:
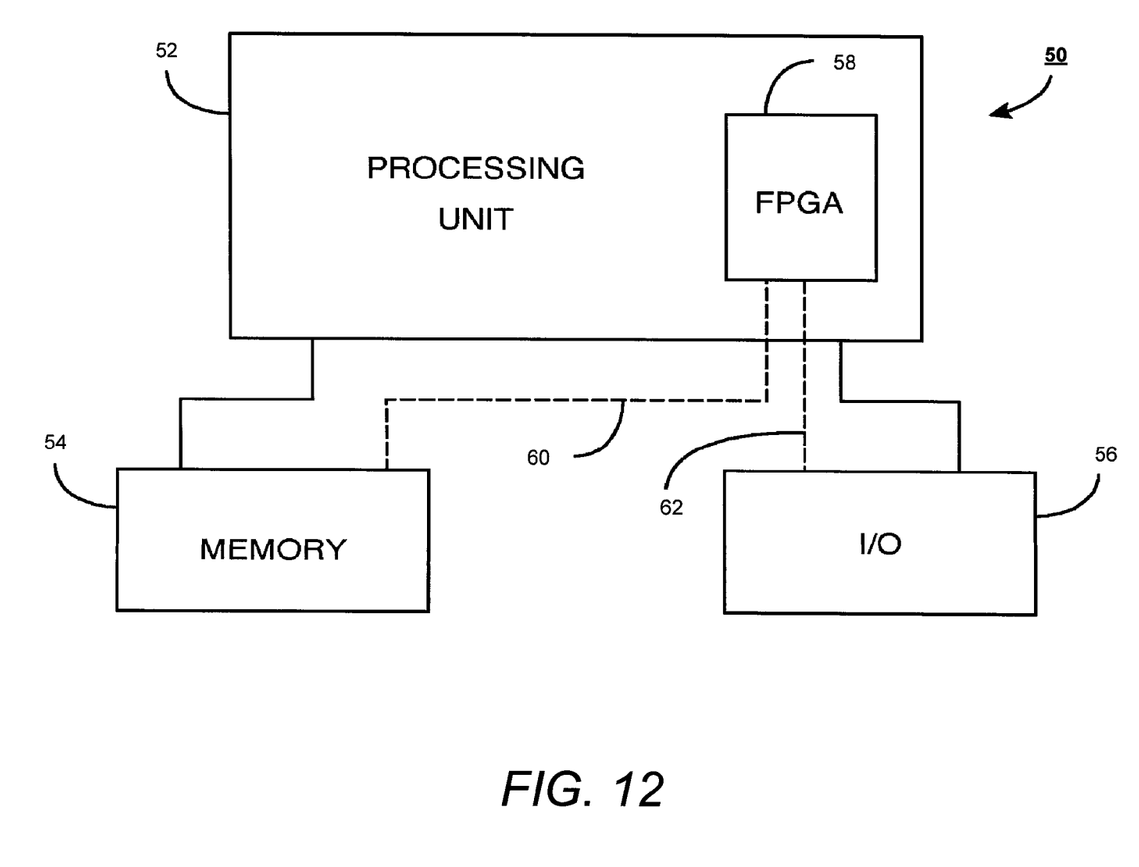
FIG. 12 shows a block diagram of an exemplary digital system that may employ PDN noise reduction techniques as disclosed herein.

FIG. 12 shows a block diagram of an exemplary digital system 50 that may employ PDN noise reduction techniques as disclosed herein. System 50 may be a programmed digital computer system, digital signal processing system, specialized digital switching network, or other processing system.

Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method of serial data communication, the method comprising:
    encoding data to be transmitted by a communication protocol encoder of a transmitter to generate protocol-encoded data;
    serializing the protocol-encoded data to generate serialized data;
    encoding the serialized data for power-delivery-network noise reduction (PNR) using a PNR encoder so as to generate PNR-encoded serial data;
    providing the serialized data to a first input of a first selector;
    providing the PNR-encoded serial data to a second input of the first selector;
    outputting the serialized data by the first selector when a first control signal indicates a first operating mode in which said encoding is disabled;
    outputting the PNR-encoded serial data by the first selector when the first control signal indicates a second operating mode in which said encoding is enabled;
    driving onto a communication channel the serialized data signal in the first operating mode and the PNR-encoded serial data signal in the second operating mode.

2. The method of claim 1, wherein encoding the serialized data for power-delivery-network noise reduction is performed using a linear feedback shift register having a cascade of flip-flop circuits which includes a first flip-flop circuit, an interior flip-flop circuit, and a last flip-flop circuit, and wherein outputs of the interior flip-flop circuit and the last flip-flop circuit are provided to an input of the first flip-flop circuit, the method further comprising:
    determining a resonance characteristic of power-delivery-network noise that couples through power rails to the transmitter, and
    selecting the interior flip-flop from a plurality of flip-flop circuits in an interior of the cascade depending on said resonance characteristic of the power-delivery-network noise.

3. The method of claim 1, wherein encoding the serialized data for power-delivery-network noise reduction is performed using a selectively-enabled sequence generator that encodes portions of the serialized data while other portions of the serialized data remain unencoded.

4. The method of claim 3, further comprising:
    determining a resonant frequency of power-delivery-network noise that couples through power rails to the transmitter, and
    enabling the selectively-enabled sequence generator periodically to reduce the power-delivery-network noise at the resonant frequency.

5. The method of claim 1, further comprising:
    receiving data signal driven from the communication channel by a buffer at a receiver;
    decoding the received data signal by a PNR decoder to obtain PNR-decoded received data;
    providing the received data signal to a first input of a second selector;
    providing the PNR-decoded received data to a second input of the second selector;
    outputting the received data signal by the second selector when a second control signal indicates the first operating mode;
    outputting the PNR-decoded received data by the second selector when the second control signal indicates the second operating mode;
    deserializing selected data output from the second selector to re-generate the protocol-encoded data; and
    decoding the protocol-encoded data by a communication protocol decoder to re-generate the data to be transmitted.

6. The method of claim 5,
    wherein encoding the serialized data for PNR is performed using a first linear feedback shift register at the transmitter, and decoding the PNR-encoded serial data is performed using a second linear feedback shift register at the receiver, and
    wherein each of the first and second linear feedback shift registers comprises a cascade of flip-flop circuits which includes a first flip-flop circuit, an interior flip-flop circuit, and a last flip-flop circuit, and wherein outputs of the interior flip-flop circuit and the last flip-flop circuit are provided to an input of the first flip-flop circuit, the method further comprising:
determining a resonance characteristic of power-delivery-network noise that couples through power rails to the transmitter, and
selecting the interior flip-flop from a plurality of flip-flop circuits in an interior of the cascade depending on said resonance characteristic of the power-delivery-network noise.

7. The method of claim 5, wherein encoding the serialized data for PNR is performed using a first selectively-enabled sequence generator at the transmitter, and decoding the PNR-encoded serial data is performed using a second selectively-enabled sequence generator at the receiver, and wherein each of the first and second selectively-enable sequence generators encodes portions of the serialized data while other portions of the serialized data remain unencoded.

8. The method of claim 7, further comprising:
determining a resonant frequency of power-delivery-network noise that couples through power rails to the transmitter, and
enabling the selectively-enabled sequence generator periodically to reduce the power-delivery-network noise at the resonant frequency.

9. An apparatus for serial data communication, the apparatus comprising:
a communication protocol encoder that encodes data to be transmitted so as to generate protocol-encoded data;
a serializer that serializes the protocol-encoded data to generate serialized data;
a power-delivery-network noise reduction (PNR) encoder that encodes the serialized data to generate PNR-encoded serial data;
a first selector that receives the serialized data at a first input and the PNR-encoded serial data at a second input and that is controlled by a first control signal such that the serialized data is output when the first control signal is in a first state and the PNR-encoded serial data is output when the first control signal is in a second state, wherein the first state indicates a first operating mode in which the PNR encoder is disabled, and the second state indicates a second operating mode in which the PNR encoder is enabled;
a driver circuit that drives data output from the first selector onto a communication channel such that the serialized data is driven onto the communication channel in the first operating mode and the PNR-encoded serial data is driven onto the communication channel in the second operating mode.

10. The apparatus of claim 9, wherein the PNR encoder comprises a linear feedback shift register.

11. The apparatus of claim 9, wherein the PNR encoder comprises a selectively-enabled sequence generator.

12. The apparatus of claim 11, wherein the selectively-enabled sequence generator periodically generates a sequence of alternating bits.

13. The apparatus of claim 9, further comprising:
a buffer at a receiver that receives data output driven from the communication channel;
a PNR decoder that decodes the received data output to obtain PNR-decoded received data;
a second selector that receives the received data output at a first input and the PNR-decoded received data at a second input and that is controlled by a second control signal such that the received data output is output when the second control signal is in a first state and the PNR-decoded received data is output when the second control signal is in a second state;
a deserializer that deserializes selected data output from the second selector to re-generate the protocol-encoded data; and
a communication protocol decoder configured to decode the protocol-encoded data to re-generate the data to be transmitted.

14. The apparatus of claim 13, wherein the PNR encoder comprises a first linear feedback shift register, and the PNR decoder comprises a second linear feedback shift register.

15. The apparatus of claim 13, wherein the PNR encoder comprises a first selectively-enabled sequence generator, and the PNR decoder comprises a second selectively-enabled sequence generator.

16. The apparatus of claim 15, wherein the first and second selectively-enabled sequence generators each periodically generates a sequence of alternating bits.

17. A serial communication system, the system comprising:
a transmitter, the transmitter further comprising:
a serializer that serializes a protocol-encoded data to generate serialized data,
a power-delivery-network noise reduction (PNR) encoder that encodes serialized data to generate PNR-encoded serial data,
a first selector that selectively outputs the serialized data in a first operating mode and the PNR-encoded serial data in a second operating mode, and
a driver circuit that drives data output by the first selector onto a communication channel; and
a receiver, the receiver further comprising:
a buffer that receives data output driven from the communication channel,
a PNR decoder that decodes the received data output to obtain PNR-decoded received data,
a second selector that selectively outputs the received data output in the first operating mode and the PNR-decoded received data in the second operating mode, and
a deserializer that deserializes the selected data output from the second selector to re-generate the protocol-encoded data.

18. The system of claim 17, wherein the PNR encoder comprises a first linear feedback shift register, and the PNR decoder comprises a second linear feedback shift register.

19. The system of claim 17, wherein the PNR encoder comprises a first selectively-enabled sequence generator, and the PNR decoder comprises a second selectively-enabled sequence generator.

20. The system of claim 19, wherein the first and second selectively-enabled sequence generators are each configured to periodically generate a sequence of alternating bits.

* * * * *